United States Patent [19]
Easterly

[11] 3,732,539
[45] May 8, 1973

[54] SAFETY LIGHT SYSTEM FOR TRUCKS

[76] Inventor: Herbert D. Easterly, 2515 Cliffbourne St. N.W., Apt. 5, Washington, D.C. 20009

[22] Filed: May 19, 1971

[21] Appl. No.: 144,781

[52] U.S. Cl....................340/62, 340/78, 340/81 R, 340/263, 340/266
[51] Int. Cl. .............................................B60q 1/54
[58] Field of Search.....................340/62, 263, 264, 340/266

[56] References Cited

UNITED STATES PATENTS

| 3,310,774 | 3/1967 | Marian | 340/62 |
| 3,375,496 | 3/1968 | Antunovil | 340/72 |
| 3,490,295 | 1/1970 | Westby et al. | 340/263 X |
| 3,271,677 | 9/1966 | Peter et al. | 340/266 X |
| 2,329,715 | 9/1943 | Grier | 340/266 UX |
| 3,550,076 | 12/1970 | Kent | 340/22 |

FOREIGN PATENTS OR APPLICATIONS

| 355,186 | 1931 | Great Britain | 340/264 |
| 448,219 | 8/1927 | Germany | 340/264 |
| 933,375 | 12/1947 | France | 340/264 |
| 616,113 | 6/1961 | Italy | 340/62 |

*Primary Examiner*—John W. Caldwell
*Assistant Examiner*—Kenneth N. Leimer
*Attorney*—Hood, Gust, Irish, Lundy & Coffey

[57] ABSTRACT

A speed signal system for a vehicle and particularly for a truck comprising a speedometer mechanism including the usual movable indicator mounted and arranged to move along a path to provide a visual indication of the speed at which the vehicle is traveling, a plurality of switches disposed in spaced apart relationship along the path to provide electrical outputs representing the speed of such a vehicle, and an actuator for the switches movable along with the said indicator. A plurality of signal lights are provided and circuits operatively connect the signal lights to the switches. Four such switch means may be used to indicate very low speed, low to intermediate speed, normal operating speed, and excessive speed, respectively.

5 Claims, 10 Drawing Figures

INVENTOR
HERBERT D. EASTERLY

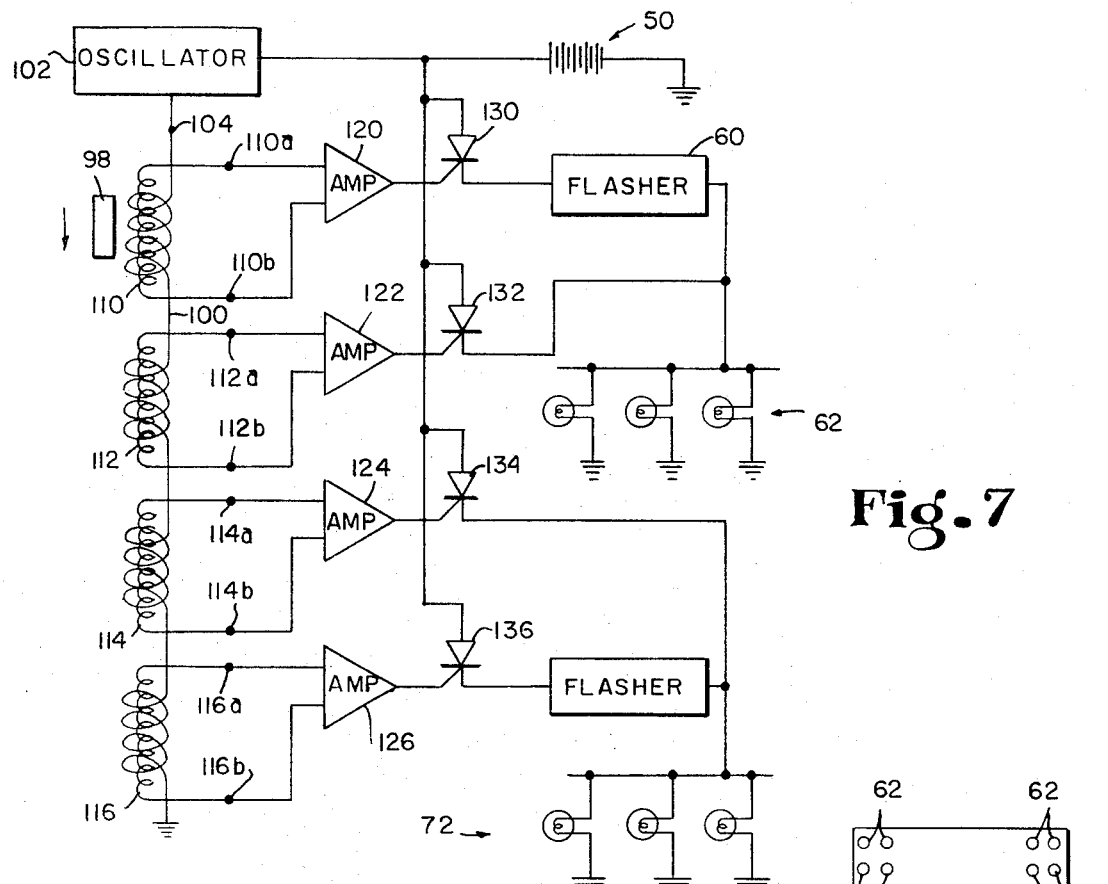
Fig.7
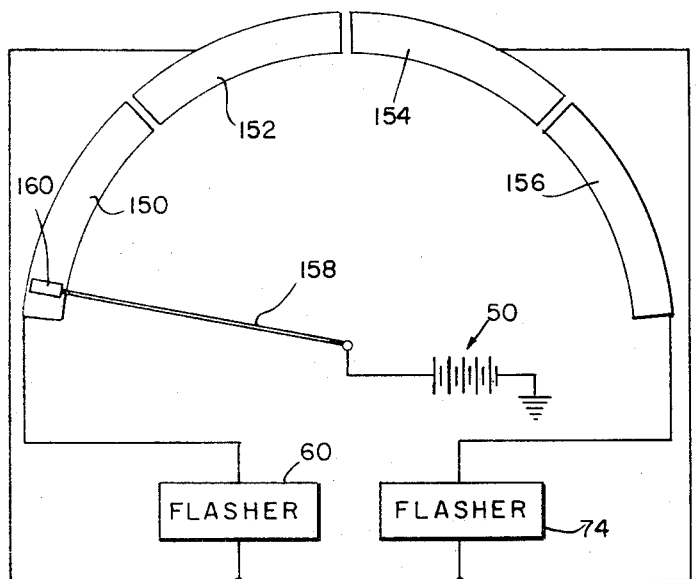
Fig.8
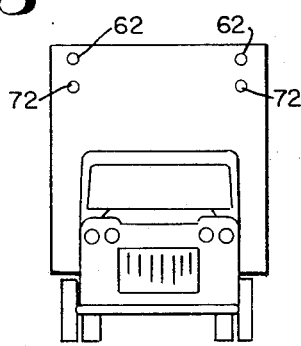
Fig.9
Fig.10
INVENTOR
HERBERT D. EASTERLY

SAFETY LIGHT SYSTEM FOR TRUCKS

It is a primary object of my present invention to provide a signal system for vehicles which is arranged to provide an external visual indication of the speed at which the vehicle is traveling. My system is particularly suitable for use on trucks because slow moving trucks present a great danger to following vehicles. It will be understood, however, that my system may be applied to all vehicles.

My invention, therefore, is in the field of signal light systems for vehicles.

The prior art indicates that many persons have been interested in and have attempted to solve the problem of providing a signal light system for use on vehicles, which system will provide accurate information to other motorists as to the speed at which the vehicle is traveling. A representable sample of the prior art is disclosed in the following U. S. patents: U.S. Pat. No. 3,215,979 issued to Ryan; U.S. Pat. No. 3,281,786 issued to Leichsenring; U.S. Pat. No. 3,320,586 issued to Wagner; U.S. Pat. No. 3,310,774 issued to Marian, U.S. Pat. No. 3,535,680 issued to Onksen et al.; and U.S. Pat. No. 3,492,638 to Lane.

Such prior art devices have not, to my knowledge, been adopted and used, to any significant extent, by the trucking industry or, for that matter, by the motoring public or vehicle manufacturers. One of the primary reasons that such prior art systems have not been used is that they have been extremely expensive, complicated, and not readily adaptable to existing vehicles.

My present invention is an improvement over the prior art devices because it is simple and easy to install, simple in operation, and inexpensive. My invention comprises a speedometer mechanism which will provide electrical outputs representing ranges of vehicle speeds as well as a visual indication to the driver of the speed at which the vehicle is traveling. Existing vehicles can be modified to use my system by replacing their present speedometer with a speedometer mechanism in accordance with my concept and then attaching either two or four sets of signal lights to the vehicles. Circuit means including, for instance, three current-operated switch means or relays and two or three circuit interrupters, commonly called flashers, may be used to connect the electrical outputs of my speedometer mechanism to the signal lights. The relays and the flashers and the lights can, of course, be mounted on the vehicle in such a manner that they can be easily replaced if they wear out.

I propose to provide my speedometer mechanisms in such a manner that they are enclosed in containers which can be sealed after the mechanism, and particularly the switch means thereof, are calibrated to provide the proper electrical outputs at speeds prescribed by, for instance, regulating bodies. Then, such regulating bodies can inspect the vehicles to see if the seals on the speedometer mechanisms have been tampered with.

One embodiment of my invention is such that it will provide a flashing signal at excessive speeds as well as a flashing signal at low and very low speeds. Then, police officials charged with the responsibility of regulating traffic can observe the vehicles, and particularly the trucks, to see if they are traveling at very low speeds or excessive speeds.

One of the basic purposes of my invention is to provide a signal lighting system for heavy and large trucks, which system will automatically operate to indicate the speed of the truck to approaching motorists. My system, therefore, will be particularly advantageous on our highway systems when it is necessary for trucks to pull out into the traffic. It is well known that heavy, large trucks initially pulling out onto a highway cannot build up a sufficiently high speed quickly to get out of the way of oncoming traffic. Quite often, a motorist will run into the rear of such a truck simply because the motorist is traveling at a high speed and is not warned in sufficient time that the truck is traveling at a very low speed. This often occurs when a truck is pulling out of a rest place on an interstate highway or away from a truck weighing station.

My invention, therefore, may include first, second and third switch means disposed along the path of movement of the speedometer indicator and the switch actuator means movable with the indicator. The first switch means may be positioned along the path to provide an electrical output representing a first and low range of vehicle speed, the second switch means may be positioned along the path to provide an electrical output representing a second and higher range of vehicle speed, and the third switch means may be positioned along the path to provide an electrical output representing a still higher and normal operating range of vehicle speed. If desired, my system may include a fourth switch means positioned along the path to provide an electrical output representing a fourth range of speed in excess of the third range of speed.

My system can be installed such that it can be switched off and made inoperative in city traffic or in states not permitting such systems.

The colors of the signal lights used with my system, and whether or not such lights are flashing, may be determined on the basis of providing maximum noticeability.

In the drawings:

FIG. 7 is a schematic showing how the speedometer system of FIG. 5 is used to control two sets of lights to indicate four speed conditions;

FIG. 8 is a schematic of a speedometer including a sliding contact arrangement in accordance with my invention and showing the speedometer used to control two sets of lights to show four speed conditions;

FIG. 9 is a view of the rear end of a truck; and

FIG. 10 is a view of the front end of a truck.

Figure 1:
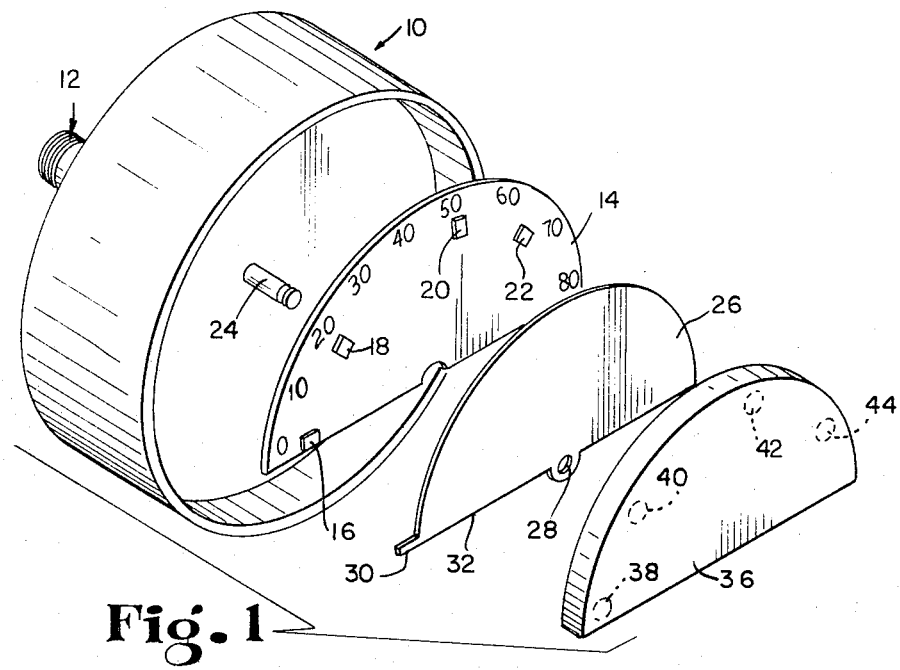
FIG. 1 is an exploded perspective view of a speedometer constructed in accordance with my present invention.

Referring particularly to FIG. 1, it will be seen that I have illustrated rather diagrammatically a speedometer arrangement including a housing 10 from the rear end of which extends a conventional speedometer coupling 12 to which a flexible drive cable or the like may be drivingly connected. In accordance with my present invention, the scale face of the speedometer, indicated at 14, is modified to carry four light-actuated switching means 16, 18, 20, 22 disposed in an arcuate path concentric with the shaft 24 which is driven by the speedometer mechanism. A member 26 which is in the shape of one-half of a circular plate is mounted on the shaft 24 as indicated at 28 to be disposed in front of the scale face 14 with the outer peripherally extending edge of the member 26 being at a smaller radius than the radial distance to the scale numbers on the face 14. The member 26 carries a pointer 30 which serves as the usual speedometer indicator or pointer to give a visual indication of the speed at which the vehicle is being driven. The member 26 provides a radially extending straight edge 32 extending radially outwardly toward the pointer 30. The purpose and function of this edge 32 will become apparent as this description progresses.

Disposed in front of the member 26 and scale face 14 is a light mounting block 36 which carries four lights 38, 40, 42, 44 associated respectively with the switch means 16, 18, 20, 22. Particularly, each light source 38-44 is arranged to direct light at its associated light-actuated switch means 16-22. The member 26 is a shield means which functions to expose the switch means 16-22 to their respective light sources when the vehicle is traveling at a speed corresponding to the location of the switch means on the face 14.

For instance, the switch means 16 is energized by light 38 as soon as the vehicle begins to move; the switch means 18 is energized by light 40 as soon as the vehicle is moving at a speed of approximately 20 miles per hour; the switch means 20 is energized by light 42 when the vehicle is moving at a speed of 50 miles per hour; and the switch means 22 is energized by light 44 when the vehicle is moving at a speed of 65 miles per hour. My invention is not limited to the positions of the switch means 16-22 and it will be appreciated that these switch means may be located in accordance with governmental regulations or safety regulations defined by any controlling body.

The light-actuated switch means may take any number of conventional forms. For instance, I may may light-actuated diodes or light-actuated silicon controlled rectifiers. Such devices change their electrical state or condition when subjected to light. For instance, a light-actuated silicon controlled rectifier can be used in a manner such that it is substantially non-conducting in the absence of light and conducting in the presence of light.

The lights 38-44 may be any conventional lights arranged in the holder 36 in such a manner that they project light through apertures 38a, 40a, 42a, 44a, respectively, toward their associated switch means 16-22.

Figure 3:
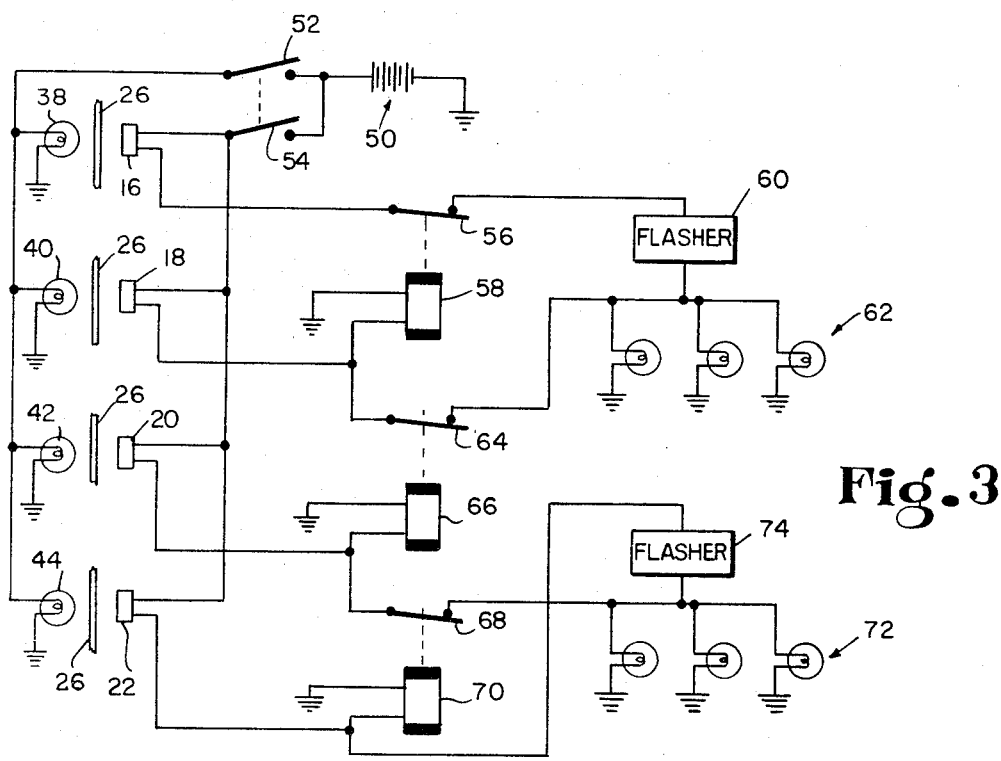
FIG. 3 is a schematic showing how the speedometer arrangement of FIG. 1 is used to control two sets of lights to indicate four speed conditions.
Figure 2:
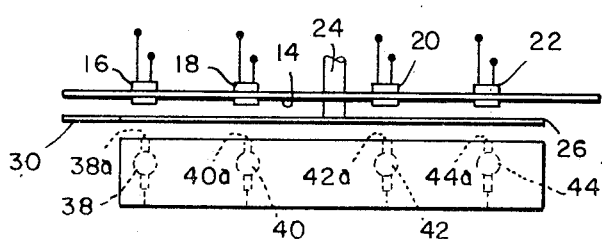
FIG. 2 is a fragmentary plan view showing a portion of the speedometer illustrated in FIG. 1, and particularly the light sources and light-actuated switch means.

Turning to FIG. 3, it will be seen that the lights 38-44 and the anodes of the switch means 16, 18, 20, 22 are connected to the positive side of a battery 50 by switches 52, 54, the negative side of the battery being connected to ground. The switches 52, 54 may be mechanically connected together for simultaneous operation as indicated. These switches may be conventional manually operable switches so that the operator of a vehicle can operate my signalling system if he chooses to or they may be made part of the ignition switching system so that my signalling system will operate at all times when the vehicle is running. In the illustration of FIG. 3, fragments of the member 26 are shown between each light 38-44 and its associated switch means 16-22.

When the vehicle begins to move, the switch means 16 is exposed to light from the light 38 as the member 26 turns clockwise about its axis to of light the edge 32 clockwise to expose the switch means 16. The switch means 16 becomes conductive in the presence of light so that current can flow from the battery 50 through the switch 54, switch means 16 and a normally closed switch 56 of a relay 58 to a flasher 60 and through the flasher to a set of lights indicated at 62. The flasher 60 may be any conventional periodic circuit interrupter such as a thermally operated interrupter or a solid-state oscillator.

Thus, the set of lights 62 will begin to flash as soon as the vehicle starts to move. Alternatively, if desired, the switch means 16 can be positioned so that it is always exposed to light from the light 38 so that the set of lights 62 will flash as soon as the switch 54 is closed.

As the speed of the vehicle increases to the point where the edge 32 exposes the switch means 18, the switch means 18 becomes conductive so that current can flow from the battery 50 through the switch means 18 and through a switch 64 of a relay 66 to the set of lights 62. The current flowing through the switch means 18 also flows through the field coil of the relay 58 to open the normally closed switch 56 to deenergize the flasher 60. Thus, when the speed of the vehicle reaches a point at which the switch means 18 is exposed to light, the light 62 will be steadily energized to provide a predetermined signal.

As the speed of the vehicle increases further to the point at which the switch means 20 is exposed to the light 42, the switch means 20 will be conductive so that current can flow from the battery 50 through the switch means 20 and a normally closed switch 68 of a relay 70 to a set of lights indicated at 72. The current flowing through the switch means 20 also flows through the field coil of the relay 66 to open the switch 64 to deenergize the light 62. It will be appreciated that when the switch means 20 is conducting, the switch means 16 and 18 are also conducting so that the relay 58 is energized to open the switch 56 at the same time the relay 66 is energized to open the switch 64.

When the speed of the vehicle is such that the switch means 22 is exposed to light from the light 44, the switch means 22 is conducting to energize the relay 70 to open the switch 68 and to energize the flasher 74 so that the lights 72 will flash. Thus, the switch means 22 is a high speed switch means arranged to operate the flasher 74 so that the lights 72 will flash to indicate the very high speed.

In recapitulation, as to the operation of the system shown in FIG. 3, the lights 62 will flash when the vehicle is operating at very low speeds, for instance, from 0 to 20 miles per hour and they will be steadily illuminated at vehicle speeds from, for instance, 20 to 50 miles per hour. Then, the lights 72 will be steadily illuminated at vehicle speeds from, for instance, 50 to 65 miles per hour and they will flash at speeds over, for instance, 65 miles per hour. The flashing lights 72 will serve to indicate to other motorists, as well as to officials, that the vehicle is traveling at excessive speeds. One of the lights 72 may be installed on or in the vehicle in such a manner that the operator thereof will detect the flash and realize that he is moving at an excessive speed. For instance, one of the lights 72 may be made smaller and may be placed on the dash panel of the vehicle.

The location of the lights 62 and 72 as well as the number of lights is not limited. I believe that a plurality of such lights 62, 72 should be placed at the rear of the vehicle as well as at the front end of the vehicle as suggested in FIGS. 9 and 10.

Of course, vehicles are ordinarily equipped with red lights to indicate braking. The lights of my system may be in addition to the usual brake lights or the brake lights may be made a part of my system.

As a matter of illustration, without limitation, the lights 62 in FIG. 3 may be amber while the lights 72 may be green. If such a system is applied to a vehicle having the usual red brake lights, operation of the vehicle would illuminate the red brake lights when the brakes are on, flashing amber lights when the vehicle is moving at very low speeds, steady amber lights when the vehicle is building up its speed to running speed, steady green lights when the vehicle is operating at running speeds, and flashing green lights when the vehicle is running at excessive speeds.

Figure 4:
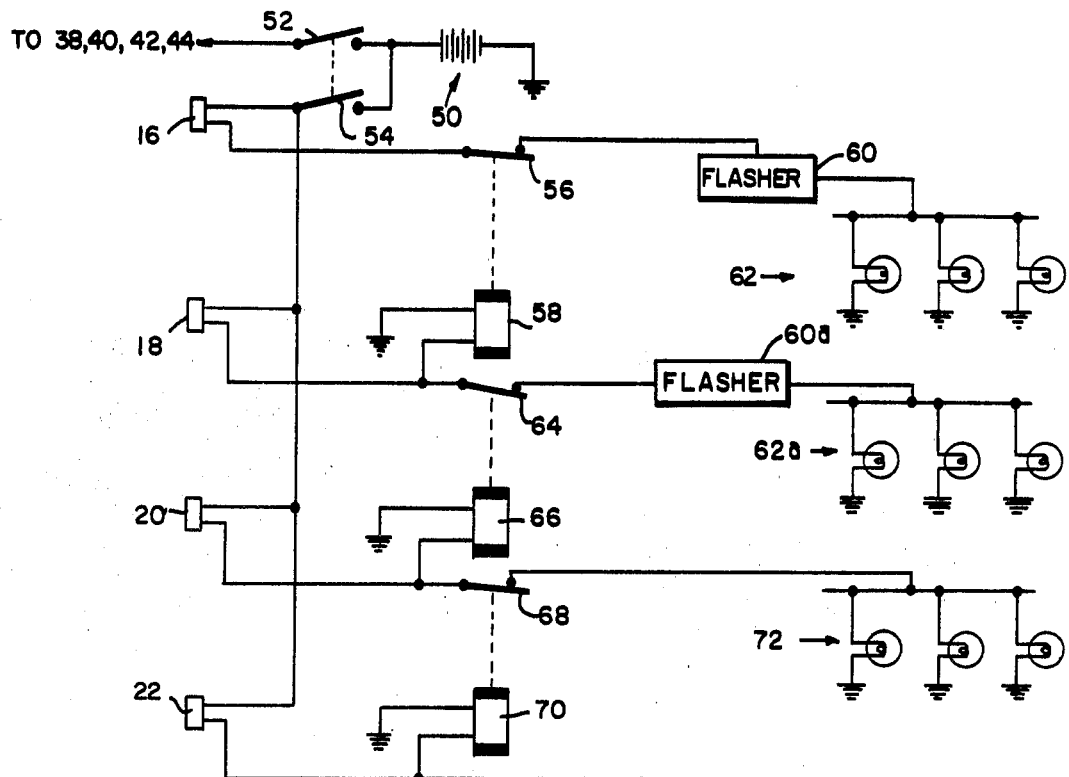
FIG. 4 is a schematic showing how the speedometer arrangement of FIG. 1 is used to control four sets of lights to show four speed conditions.

Turning now to FIG. 4, it will be seen that the system illustrated therein includes two additional sets of lights 62a, 72a so that four differently colored lights can be used to indicate four different speed conditions. The switch means 16–22 and the relays 58, 66, 70 operate in the same manner discussed in conjunction with FIG. 3. The only difference is that at very low speeds the lights 62 are illuminated through the switch means 16 and then at speeds above the position of the switch means 18, and below the position of the switch means 20, the lights 62a are illuminated, for instance, through a flasher 60a. Then, at running speeds, the lights 72 are illuminated through the switch means 20 and at excessive speeds the lights 72a are illuminated through the switch means 22 and flasher 74. Only one of the four sets of lights 62, 62a, 72, 72a will be illuminated at any one time.

One advantage of the light-actuated switch means 16–22 is that these switch means do not put any type of load or drag upon the speedometer mechanism to cause undue wear of the mechanism or to change its calibration characteristics. The member 26 may be made extremely light and thin so that it places no load of any consequence on the shaft 24. Further, the light-actuated switch means 16–22 are known to be extremely reliable such that they can operate the life of the vehicle without change. Of course, the relays 58, 66, 70, flashers 60, 74 and lights 62, 62a, 72, 72a may be packaged in such a manner that they can be easily replaced as needed.

Thus, the speedometer of FIGS. 3 and 4 may be provided as a sealed unit which will provide a visual display to the operator of the vehicle as well as electrical outputs which can be used to operate lights to provide an external indication as to the range of the speed of the vehicle.

Figure 5:
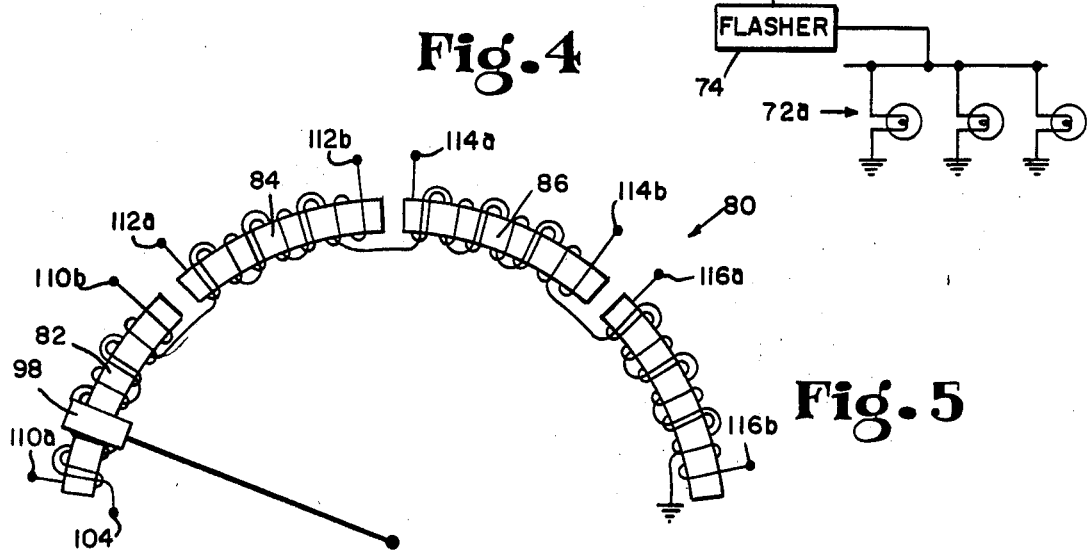
FIG. 5 is a diagrammatical view showing a magnetic sensing device for use in a speedometer mechanism.
Figure 6:
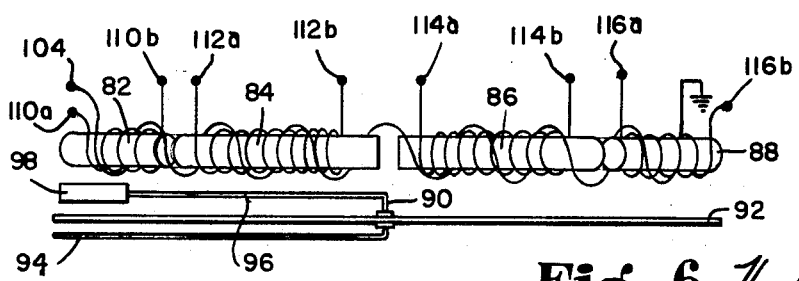
FIG. 6 is a fragmentary somewhat diagrammatical plan view showing the movable indicator portion of the speedometer arrangement of FIG. 5.

Referring now to FIGS. 5, 6 and 7, it will be seen that I have illustrated an electro-magnetic speed indicating system for use in conjunction with a speedometer, the system including four arcuately shaped cores 82, 84, 86, 88 concentrically arranged about the axis 90 of the speedometer, i.e., the axis of the scale face 92 and the pivot axis for the conventional pointer 94.

An arm 96 is arranged behind the scale face 92 to pivot with the pointer 94 about the axis 90. This arm 96, which is driven by the speedometer mechanism carries, at its distal end, a permanent magnet 98. The length of the arm 96 is approximately equal to the radius of curvature of the arc formed by the cores 82–88.

A primary winding 100 including a plurality of turns of wire is wrapped about the cores 82–88, one side of the winding 100 being connected to the output of an oscillator 102 as indicated at 104 and the other end of the winding 100 being connected to ground. A secondary coil 110, 112, 114, 116 is disposed on each core 82–88 to be coaxial with the primary coil winding 100 disposed thereon. Each secondary coil 110–116 has its output ends indicated at 110a, 110b, 112a, 112b, 114a, 114b, 116a, 116b. The oscillator 102 is connected to the battery 50. The oscillator 102 may be any conventional type of solid-state oscillator which will provide an oscillatory pulse-type output when supplied with a direct current input. Such oscillators conventionally include resistor-capacitor networks defining the frequency of the oscillation as well as transistors which are switched off and on to provide the pulse type output. The primary winding 100, therefore, carries an oscillatory current which is applied, by transformer action, to the secondary coil or winding 110, 112, 114, 116 on each core 82, 84, 86, 88. The output of each secondary winding is connected to the input of an amplifier 120, 122, 124, 126. The output of each amplifier is connected to the gate electrode of a silicon controlled rectifier 130, 132, 134, 136. The anode of each silicon controlled rectifier is included to the positive side of the battery 50 with the cathode of the rectifier 130 being connected through the flasher 60 to the lights 62 while the cathode of the rectifier 132 is connected directly to the lights 62 and with the cathode of the rectifier 134 connected directly to the lights 72 while the cathode of the rectifier 136 is connected through the flasher 74 to the lights 72.

The silicon controlled rectifiers 130–136 are conductive when signals of a suitable level are applied to their gate electrodes. I obtain these gate signals by moving the permanent magnet 98 into close proximity to the various cores 82, 84, 86, 88. Particularly, each amplifier 120, 122, 124, 126 will provide a suitable gating signal when the permanent magnet 98 is adjacent the core 82–88 on which its associated secondary winding 110–116 is disposed.

The input to each amplifier 120–126, when the permanent magnet 98 is not adjacent its associated secondary winding, is a function of the level and frequency of the signal in the primary winding 100 and the transformer field action provided in its core. The primary winding 100 and secondary windings 110, 112, 114, 116 and the cores 82, 84, 86, 88 are proportioned and constructed such that each secondary winding will provide a higher level output when the permanent magnet 98 is adjacent thereto, the high level output being sufficient to trigger its associated amplifier 120–126 into operation to provide a suitable gating signal. Circuits which will provide suitable amplified outputs upon response to higher level inputs are well known and need not be discussed, in detail, in this description.

The system of FIGS. 5–7 is such that the lights 62 will flash when the permanent magnet 98 is adjacent the core 82 and be steadily illuminated when the permanent magnet is adjacent the core 84 and such that the lights 72 will be steadily illuminated when the permanent magnet 98 is adjacent the core 86 and flashing when the permanent magnet is adjacent the core 88.

Turning now to FIG. 8, it will be seen that I have shown a speed sensing arrangement including four arcuately disposed contact strips 150, 152, 154, 156 and an arm 158 pivotally movable about the center of curvature for the contact strips. This arm 158 is driven by the speedometer mechanism in the same manner that the usual pointer or indicator is driven. A brush 160 is carried at the distal end of the arm 158 to engage the contact strips 150–156. The arm 158 is conductive and the proximal end of the arm is connected by conventional circuit means to the positive side of the battery 50. The strip 150 is connected to the flasher 60 and through the flasher 60 to the lights 62 while the strip 152 is connected directly to the lights 62. The strip 154 is connected directly to the lights 72 while the strip 156 is connected to the flasher 74 and through the flasher to the lights 72. Thus, the lights 62 will be flashing when the brush 160 is on the strip 150 and steadily illuminated when the brush 160 is on the strip 152. The lights 72 will be steadily illuminated when the brush 160 is on the strip 154 and flashing when the brush is on the strip 166.

The brush 160 may be constructed in any generally well recognized form suitable for providing good electrical contact without placing too much drag on the speedometer. For instance, the brush 160 may include a conductive tubular member carried by the arm 158, a brush element slidably carried in the tubular member, and a calibrated spring disposed in the tubular element and arranged to urge the brush element against the strips 150–156.

What is claimed is:

1. A signal system for a vehicle comprising a speedometer mechanism including movable indicator means mounted and arranged to move along a path to provide a visual indication of the speed at which the vehicle is traveling, means for driving said indicator means along said path to register the speed of such a vehicle, a plurality of switch means disposed in spaced apart relationship along said path to provide electrical outputs representing the speed of such a vehicle, and means for actuating said switch means, said actuating means being cooperatively associated with said drive means and said indicator means to move with said indicator means along said path, a plurality of signal lights adapted to be mounted on such a vehicle, and circuit means for operatively connecting said signal lights to said switch means, said plurality of switch means including first, second and third switch means disposed along said path, said first switch means being positioned along said path to provide an electrical output representing a first and low range of vehicle speed, said second switch means being positioned along said path to provide an electrical output representing a second and higher range of vehicle speed, and said third switch means being positioned along said path to provide an electrical output representing a still higher and normal operating third range of vehicle speed, and fourth switch means positioned along said path to provide an electrical output representing a fourth range of speed in excess of said third range of speed, said plurality of signal lights including first and second sets of signal lights, said first and second switch means being operatively connected by said circuit means to said first set of signal lights and said third and fourth switch means being operatively connected by said circuit means to said second set of signal lights, said circuit means including flasher means operatively connected between said first switch means and said first set of signal lights and between said fourth switch means and said second set of signal lights.

2. A signal system for a vehicle comprising a speedometer mechanism including A signal indicator means mounted and arranged to move along a path to provide a visual indication of the speed at which the vehicle is traveling, means for driving said indicator means along said path to register the speed of such a vehicle, a plurality of switch means disposed in spaced apart relationship along said path to provide electrical outputs representing the speed of such a vehicle, and means for actuating said switch means, said actuating means being cooperatively associated with said drive means and said indicator means to move with said indicator means along said path, a plurality of signal lights adapted to be mounted on such a vehicle, and circuit means for operatively connecting said signal lights to said switch means, said plurality of switch means including first, second and third switch means disposed along said path, said first switch means being positioned along said path to provide an electrical output representing a first and low range of vehicle speed, said second switch means being positioned along said path to provide an electrical output representing a second and higher range of vehicle speed, and said third switch means being positioned along said path to provide an electrical output representing a still higher and normal operating third range of vehicle speed, and fourth switch means positioned along said path to provide an electrical output representing a fourth range of speed in excess of said third range of speed, each of said switch means including a light-actuated switching means and a light source directed at said switching means, said actuating means including shield means movable with said indicating means and effective to expose said switch means to light when such a vehicle is traveling at a speed corresponding respectively to the positions of said switch means along said path, said circuit means including current operated switch means for disabling said first switch means when said second switch means is operated, said first and second switch means when said third switch means is operated, and said first, second and third switch means when said fourth switch means is operated, said plurality of signal lights including first and second sets of signal lights, said first and second switch means being operatively connected by said circuit means to said first set of signal lights and said third and fourth switch means being operatively connected by said circuit means to said second set of signal lights, said circuit means including flasher means operatively connected between said first switch means and said first set of signal lights and between said fourth switch means and said second set of signal lights.

3. A signal system for a vehicle comprising a speedometer mechanism including movable indicator means mounted and arranged to move along a path to provide a visual indication of the speed at which the vehicle is traveling, means for driving said indicator means along said path to register the speed of such a vehicle, a plurality of switch means disposed in spaced apart relationship along said path to provide electrical outputs representing the speed of such a vehicle, and means for actuating said switch means, said actuating means being cooperatively associated with said drive means and said indicator means to move with said indicator means along said path, a plurality of signal lights adapted to be mounted on such a vehicle, and circuit means for operatively connecting said signal lights to said switch means, said plurality of switch means including first, second and third switch means disposed along said path, said first switch means being positioned along said path to provide an electrical output representing a first and low range of vehicle speed, said second switch means being positioned along said path to provide an electrical output representing a second and higher range of vehicle speed, and said third switch means being positioned along said path to provide an electrical output representing a still higher and normal operating third range of vehicle speed, an oscillator for providing an oscillating signal, and each of said switch means including a transformer core extending a predetermined distance along said path, a primary winding wrapped about said core and connected to said oscillator, a secondary winding wrapped about said core, an amplifier having its input connected across said secondary winding and an output, and a silicon controlled rectifier having its gate electrode connected to the output of said amplifier, said silicon controlled rectifier being arranged, when rendered conductive, to provide current to its associated signal lights when a predetermined signal level is provided to its gate electrode, and said actuating means including a permanent magnet movable with said indicator means along said path and adjacent said cores, said permanent magnet being effective, when it is adjacent one of said cores, to increase the current level in the secondary winding on said core by an amount sufficient to cause said amplifier connected thereto to provide an amplified output sufficient to render said silicon controlled rectifier connected thereto conductive.

4. A signal system for a vehicle comprising a speedometer mechanism including movable indicator means mounted and arranged to move along a path to provide a visual indication of the speed at which the vehicle is traveling, means for driving said indicator means along said path to register the speed of such a vehicle, a plurality of switch means disposed in spaced apart relationship along said path to provide electrical outputs representing the speed of such a vehicle, and means for actuating said switch means, said actuating means being cooperatively associated with said drive means and said indicator means to move with said indicator means along said path, a plurality of signal lights adapted to be mounted on such a vehicle, and circuit means for operatively connecting said signal lights to said switch means, said plurality of switch means including first, second and third switch means disposed along said path, said first switch means being positioned along said path to provide an electrical output representing a first and low range of vehicle speed, said second switch means being positioned along said path to provide an electrical output representing a second and higher range of vehicle speed, and said third switch means being positioned along said path to provide an electrical output representing a still higher and normal operating third range of vehicle speed, and fourth switch means positioned along said path to provide an electrical output representing a fourth range of speed in excess of said third range of speed, an oscillator for providing an oscillating signal, and each of said switch means including a transformer core extending a predetermined distance along said path, a primary winding wrapped about said core and connected to said oscillator, a secondary winding wrapped about said core, an amplifier having its input connected across said secondary winding and an output, and a silicon controlled rectifier having its gate electrode connected to the output of said amplifier, said silicon controlled rectifier being arranged, when rendered conductive, to provide current to its associated signal lights when a predetermined signal level is provided to its gate electrode, and said actuating means including a permanent magnet movable with said indicator means along said path and adjacent said cores, said permanent magnet being effective, when it is adjacent one of said cores, to increase the current level in the secondary winding on said core by an amount sufficient to cause said amplifier connected thereto to provide an amplified output sufficient to render said silicon controlled rectifier connected thereto conductive.

5. The system of claim 4 in which said plurality of signal lights includes first and second sets of signal lights, said first and second switch means being operatively connected by said circuit means to said first set of signal lights and said third and fourth switch means being operatively connected by said circuit means to said second set of signal lights, said circuit means including flasher means operatively connected between said first switch means and said first set of signal lights and between said fourth switch means and said second set of signal lights.

* * * * *